United States Patent [19]

Miller

[11] Patent Number: 5,800,106
[45] Date of Patent: Sep. 1, 1998

[54] ADJUSTABLE MAGNETIC CARGO STRAP SYSTEM

[76] Inventor: Bradley A. Miller, 714 Schaefer, Richmound Saskatchewan, Canada, S0N 2E0

[21] Appl. No.: 762,279

[22] Filed: Dec. 9, 1996

[51] Int. Cl.⁶ ............................................. B60P 7/135
[52] U.S. Cl. ..................... 410/117; 410/96; 410/97; 410/100; 410/116; 24/303
[58] Field of Search ................. 410/96, 97, 100, 410/117, 121, 116, 118; 24/302, 303, 265 CD; 224/403, 562; 248/354.1, 499

[56] References Cited

U.S. PATENT DOCUMENTS

| | | | |
|---|---|---|---|
| D. 289,698 | 5/1987 | Bates | D30/30 |
| 994,822 | 6/1911 | Daly | 410/117 |
| 2,170,913 | 8/1939 | Rowe | 410/117 |
| 3,224,385 | 12/1965 | Elsner | 410/117 |
| 3,837,048 | 9/1974 | Lewis et al. | 410/116 X |
| 4,083,312 | 4/1978 | Holman, Jr. | 410/97 |
| 4,288,188 | 9/1981 | Smith | 410/97 |
| 4,464,089 | 8/1984 | Allen | 410/97 |
| 4,818,162 | 4/1989 | Zukowski et al. | 410/116 |
| 4,957,400 | 9/1990 | Karp | 410/110 |
| 4,964,771 | 10/1990 | Callihan | 410/117 |
| 5,005,827 | 4/1991 | Steinbrecher | 24/303 X |
| 5,014,890 | 5/1991 | Perry | 24/306 X |
| 5,338,136 | 8/1994 | Hetchler | 410/100 |
| 5,553,981 | 9/1996 | Braden | 410/116 |

FOREIGN PATENT DOCUMENTS 1498041  10/1967  France  .....................  24/303

*Primary Examiner*—Stephen T. Gordon

[57] ABSTRACT

A new Adjustable Magnetic Cargo Strap System for securing various quantities and sizes of objects within a bed of a pickup without damaging the pickup. The inventive device includes a strap having a first and second end, a spring-loaded buckle secured to the first end for removably securing the second end forming a loop, a first and second magnet removably secured to the strap for engaging opposing sides of the bed. The strap is preferably in a slidable engagement with the first and second magnets allowing a concentrical positioning of the spring-loaded buckle with the objects. The first and second magnets also having a resilient coating for preventing the scratching of the bed of the pickup. An end magnet is attached to the second end for securing the second end down during use to prevent fluttering of the second end of the strap during driving.

13 Claims, 4 Drawing Sheets

FIG 3
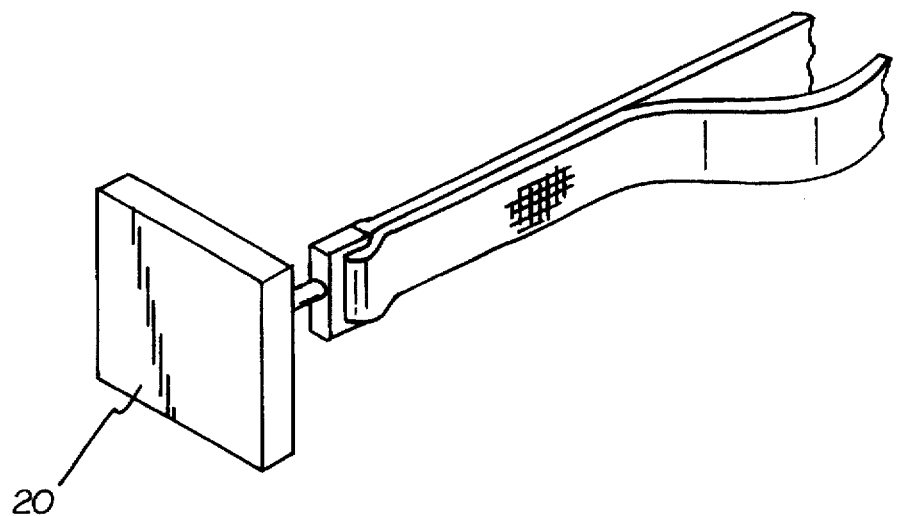
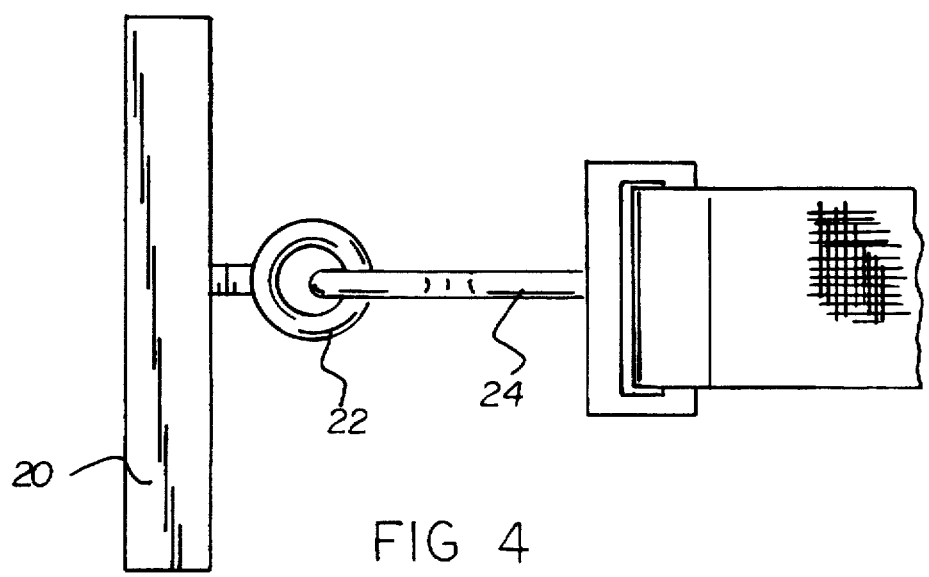
FIG 4

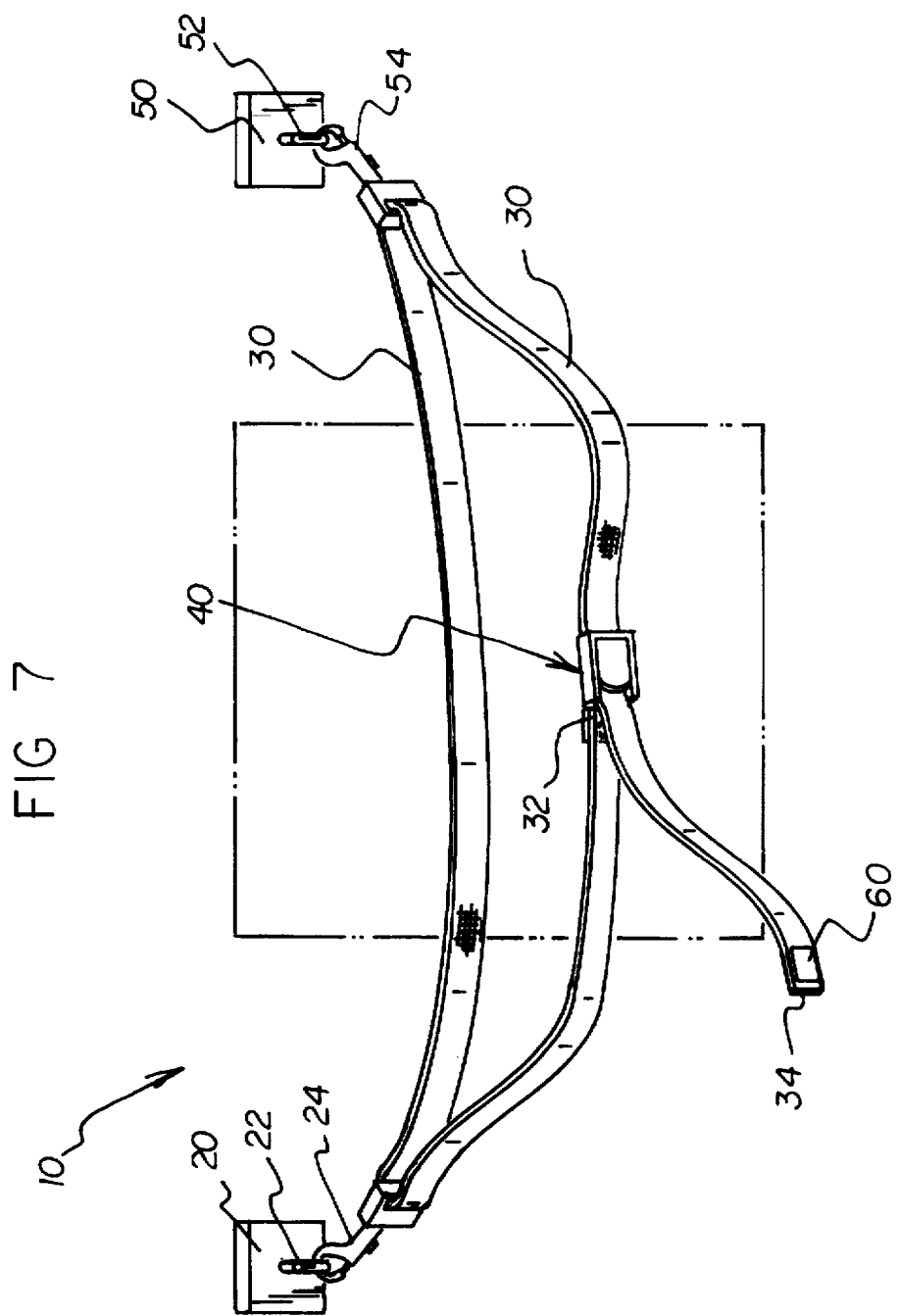

ADJUSTABLE MAGNETIC CARGO STRAP SYSTEM

BACKGROUND OF THE INVENTION

1. Field of the Invention

The present invention relates to Pickup Box Object Retaining Devices and more particularly pertains to a new Adjustable Magnetic Cargo Strap System for securing various quantities and sizes of objects within a bed of a pickup without damaging the pickup.

2. Description of the Prior Art

The use of Pickup Box Object Retaining Devices is known in the prior art. More specifically, Pickup Box Object Retaining Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Pickup Box Object Retaining Devices include U.S. Pat. No. 4,288,188; U.S. Pat. No. 5,014,890; U.S. Pat. No. 5,338,136; U.S. Pat. No. 4,083,312; U.S. Design Pat. No. 289,698 and U.S. Pat. No. 4,818,162.

While these devices fulfill their respective, particular objectives and requirements, the aforementioned patents do not disclose a new Adjustable Magnetic Cargo Strap System. The inventive device includes a strap having a first and second end, a spring-loaded buckle secured to the first end for removably securing the second end forming a loop, a first and second magnet removably secured to the strap for engaging opposing sides of the bed.

In these respects, the Adjustable Magnetic Cargo Strap System according to the present invention substantially departs from the conventional concepts and designs of the prior art, and in so doing provides an apparatus primarily developed for the purpose of securing various quantities and sizes of objects within a bed of a pickup without damaging the pickup.

SUMMARY OF THE INVENTION

In view of the foregoing disadvantages inherent in the known types of Pickup Box Object Retaining Devices now present in the prior art, the present invention provides a new Adjustable Magnetic Cargo Strap System construction wherein the same can be utilized for securing various quantities and sizes of objects within a bed of a pickup without damaging the pickup.

The general purpose of the present invention, which will be described subsequently in greater detail, is to provide a new Adjustable Magnetic Cargo Strap System apparatus and method which has many of the advantages of the Pickup Box Object Retaining Devices mentioned heretofore and many novel features that result in a new Adjustable Magnetic Cargo Strap System which is not anticipated, rendered obvious, suggested, or even implied by any of the prior art Pickup Box Object Retaining Devices, either alone or in any combination thereof.

To attain this, the present invention generally comprises a strap having a first and second end, a spring-loaded buckle secured to the first end for removably securing the second end forming a loop, a first and second magnet removably secured to the strap for engaging opposing sides of the bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Adjustable Magnetic Cargo Strap System apparatus and method which has many of the advantages of the Pickup Box Object Retaining Devices mentioned heretofore and many novel features that result in a new Adjustable Magnetic Cargo Strap System which is not anticipated, rendered obvious, suggested, or even implied by any of the prior art Pickup Box Object Retaining Devices, either alone or in any combination thereof.

It is another object of the present invention to provide a new Adjustable Magnetic Cargo Strap System which may be easily and efficiently manufactured and marketed.

It is a further object of the present invention to provide a new Adjustable Magnetic Cargo Strap System which is of a durable and reliable construction.

An even further object of the present invention is to provide a new Adjustable Magnetic Cargo Strap System which is susceptible of a low cost of manufacture with regard to both materials and labor, and which accordingly is then susceptible of low prices of sale to the consuming public, thereby making such Adjustable Magnetic Cargo Strap System economically available to the buying public.

Still yet another object of the present invention is to provide a new Adjustable Magnetic Cargo Strap System which provides in the apparatuses and methods of the prior art some of the advantages thereof, while simultaneously overcoming some of the disadvantages normally associated therewith.

Still another object of the present invention is to provide a new Adjustable Magnetic Cargo Strap System for securing various quantities and sizes of objects within a bed of a pickup without damaging the pickup.

Yet another object of the present invention is to provide a new Adjustable Magnetic Cargo Strap System which includes a strap having a first and second end, a spring-loaded buckle secured to the first end for removably securing the second end forming a loop, a first and second magnet removably secured to the strap for engaging opposing sides of the bed.

Still yet another object of the present invention is to provide a new Adjustable Magnetic Cargo Strap System that allows the user to position the buckle to the center of the object being secured thereby providing an even hold.

Even still another object of the present invention is to provide a new Adjustable Magnetic Cargo Strap System that can be positioned anywhere within the bed of the pickup without damaging the paint on the bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a magnified upper perspective view of the first magnetic.

FIG. 4 is a front view of the first magnetic.

FIGS. 6 and 7 are an upper perspective view of various sizes of first and second magnets utilizable within the present invention and a detailed perspective view of the invention respectively.

DESCRIPTION OF THE PREFERRED EMBODIMENT

Figure 1:
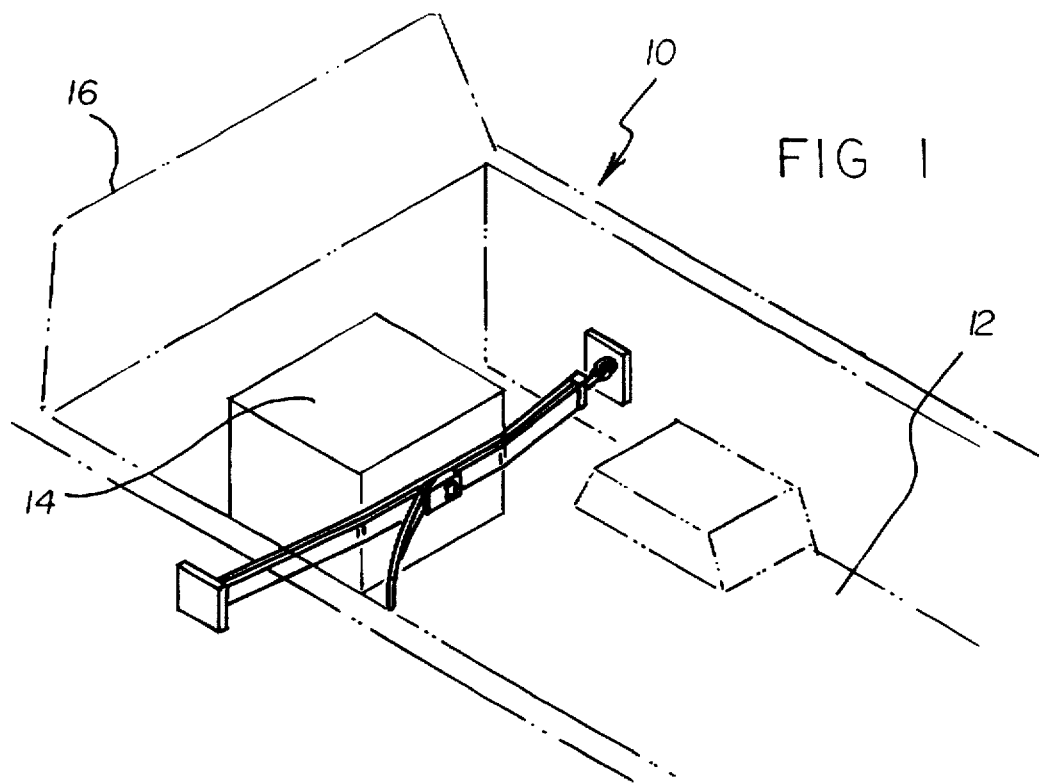
FIG. 1 is an upper perspective view of a new Adjustable Magnetic Cargo Strap System according to the present invention.

With reference now to the drawings, and in particular to FIGS. 1 through 7 thereof, a new Adjustable Magnetic Cargo Strap System embodying the principles and concepts of the present invention and generally designated by the reference numeral 10 will be described.

Figure 2:
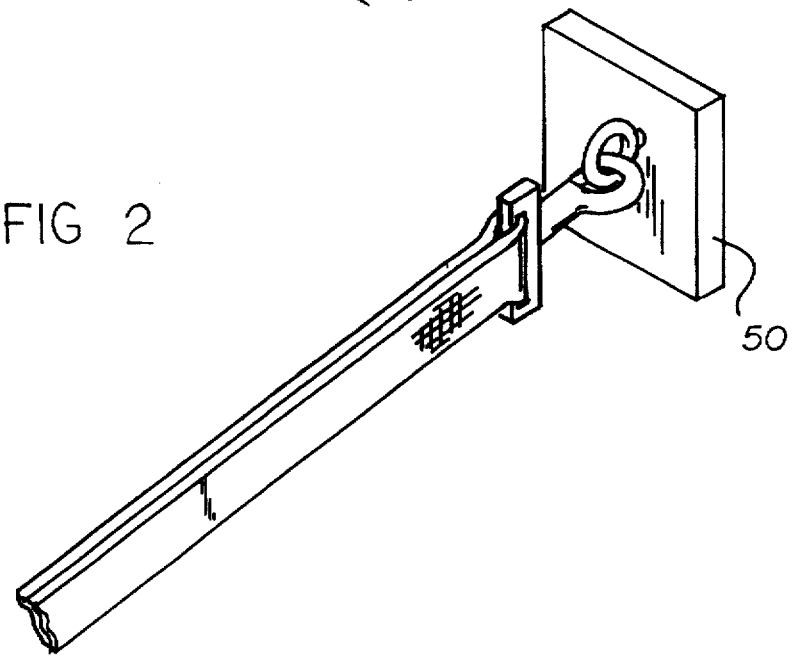
FIG. 2 is a magnified upper perspective view of the second magnetic.
Figure 5:
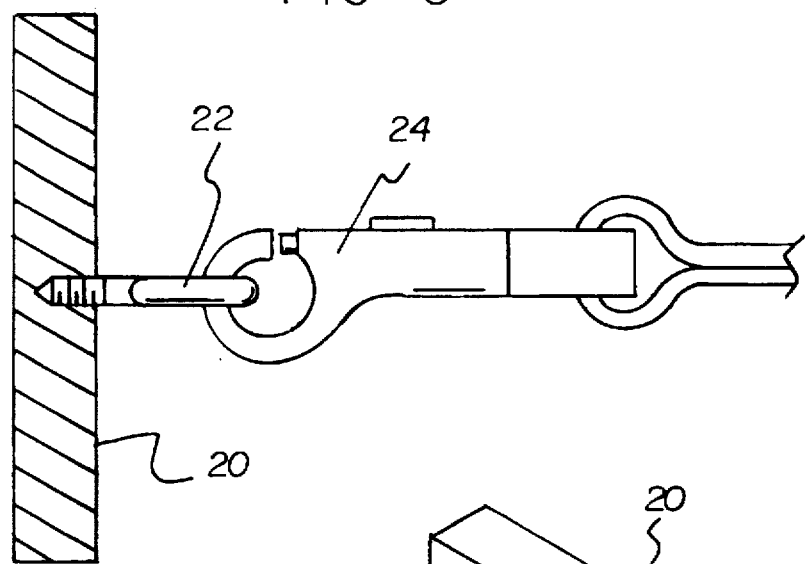
FIG. 5 is a front cutaway view of the first magnet and first eye hook.
Figure 6:
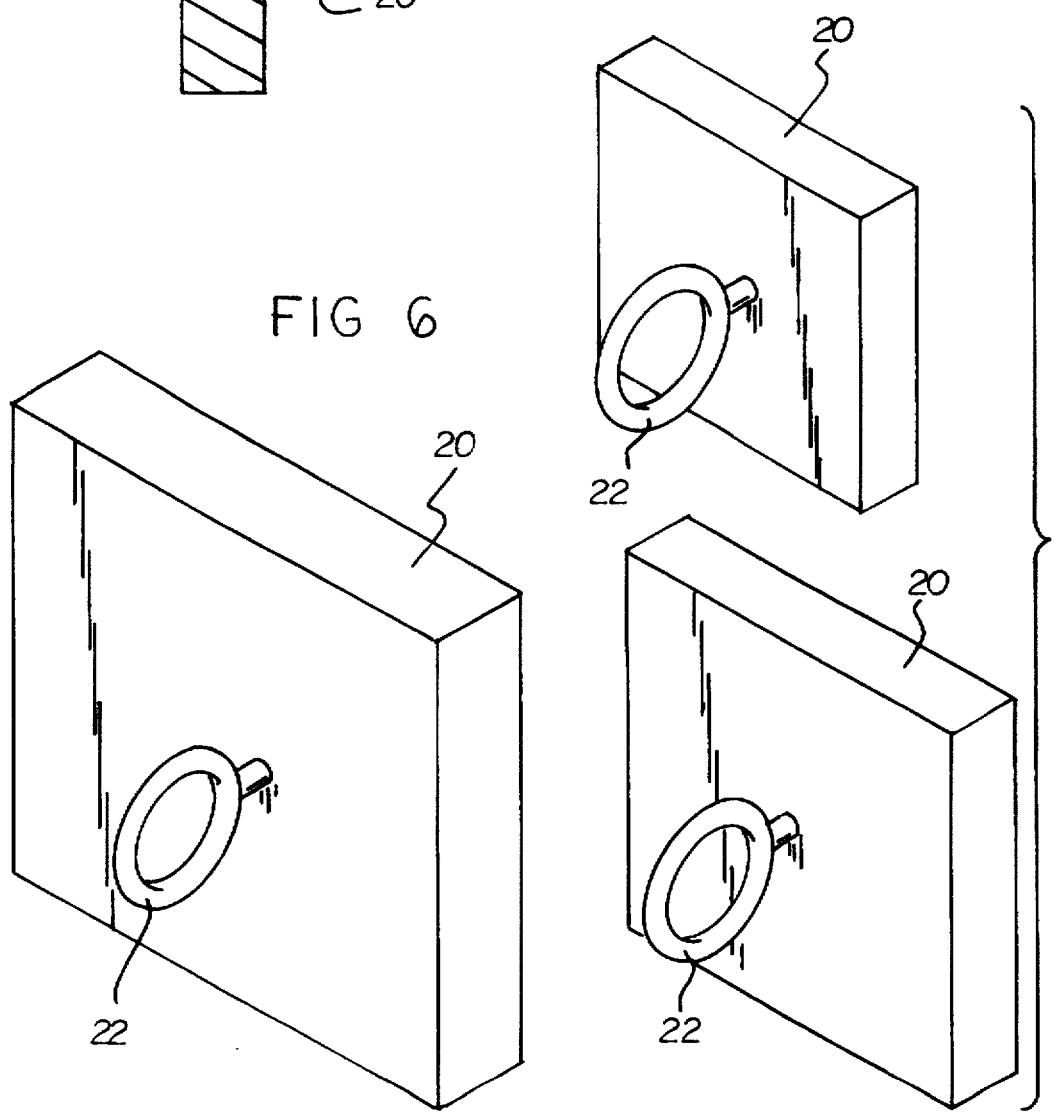

More specifically, it will be noted that the Adjustable Magnetic Cargo Strap System 10 comprises a first magnet 20 for securing to a side of a bed 12 of a pickup 16. A first eye hook 22 is secured orthogonally to the first magnet 20 as best shown in FIG. 5 of the drawings. A first removable clasp 24 engages the first eye hook 22 as shown in FIGS. 4 and 5 of the drawings. A second magnet 50 is provided for securing to an opposite side of the bed 12 of the pickup 16 from the first magnet 20. As shown in FIG. 6 of the drawings, the first magnet 20 and the second magnet 50 are formed into a various sizes sufficient to handle various sizes and weights of the objects 14 with the bed 12 of the pickup 16. Preferably, a resilient coating surrounds the first magnet 20, the end magnet 60 and the second magnet 50 for preventing scratching of the bed 12 of the pickup 16 during use. As shown in FIG. 7 of the drawings, an end magnet 60 is secured to the second end 34 for securing the second end 34 during travel of the pickup 16. A second eye hook 52 is secured orthogonally to the second magnet 50 as shown in FIGS. 1 and 2 of the drawings. A second removable clasp 54 engages the second eye hook 52. A strap 30 is provided having a first end 32 and a second end 34. The strap 30 slidably engages the first removable clasp 24 and the second removable clasp 54 forming an open loop as best shown in FIG. 1 of the drawings.

As shown in FIG. 7 the drawings, a securing means 40 attached to the first end 32 for removably engaging the second end 34 of the strap 30 for closing the open loop. The securing means is also for selectively tightening the strap 30 mesial the sides of the bed 12 of the pickup 16 for retaining an object 14 within the bed 12. The securing means 40 preferably is a spring-loaded buckle as shown in FIG. 1 of the drawings.

The main advantages of the present invention is that it secures a plurality of objects 14 such as groceries, furniture, coolers and other items in the bed 12 of the pickup 16. The present invention also eliminates annoying distraction of objects 14 banging around in bed 12 also. It also prevents costly spills, breakage and dents in bed 12 of the pickup 16. The present invention is also removable and portable which allows quickly and easy installation without drilling holes in the bed 12 of the pickup 16 thereby retaining resale value of the pickup 16. The special strap 30 design allows the user to position the buckle to the center of the object 14 being secured thereby providing an even holding of the object 14.

In use, the user positions the object 14 within the bed 12 of the pickup 16. The user then secures the first magnet 20 to a side of the bed 12 of the pickup 16. The second magnet 50 is thereafter secured to an opposite side of the bed 12. The user then pulls upon the second end 34 of the strap 30 while simultaneously pressing upon the spring-loaded buckle 40 tightening the strap 30 juxtaposed to the object 14 to prevent movement of the object 14 within the bed 12 of the pickup 16. The spring-loaded buckle 40 is released allowing it to clamp upon the strap 30 near the second end 34. The end magnet 60 secured to the second end 34 of the strap 30 is secured to the bed 12 of the pickup 16 to prevent it from whipping around within the bed 12 of the pickup 16 during travel. When the user is finished, the above procedure is simply reversed allowing the present invention to be conveniently and compactly stored within the cab of the pickup 16 until needed again.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable magnetic cargo strap system comprising:

a first magnet for securing to a side of a bed of a pickup;

a first clasp removably coupled to said first magnet;

a second magnet for securing to an opposite side of said bed of said pickup;

a second clasp removably coupled to said second magnet;

a strap having a first end and a second end, wherein said strap slidably engages said first clasp and said second clasp and forms an open loop; and a securing means attached to said first end for removably engaging said second end of said strap for closing said open loop and for selectively tightening said strap between said sides of said bed of said pickup for retaining an object within said bed.

2. The adjustable magnetic cargo strap system of claim 1, wherein said securing means comprises a spring-loaded buckle.

3. The adjustable magnetic cargo strap system of claim 2, including an end magnet secured to said second end for securing said second end during travel of said pickup.

4. The adjustable magnetic cargo strap system of claim 3, including a resilient coating surrounding said first magnet, said end magnet and said second magnet for preventing scratching of said bed of said pickup.

5. The adjustable magnetic cargo strap system of claim 1, wherein each said magnet is adapted for attachment to an interior surface of the pickup bed.

6. The adjustable magnetic cargo strap system of claim 5, wherein said securing means comprises a spring-loaded buckle.

7. The adjustable magnetic cargo strap system of claim 6, including an end magnet secured to said second end for securing said second end during travel of said pickup.

8. The adjustable magnetic cargo strap system of claim 7, including a resilient coating surrounding said first magnet, said end magnet and said second magnet for preventing scratching of said bed of said pickup.

9. An adjustable magnetic cargo strap system for securing to a bed of a pickup, the bed having a first side and a second side, the second side being opposite the first side, the cargo strap system comprising:

a first magnet adapted for securing to the first side of the bed of the pickup;

a first eye hook secured orthogonally to said first magnet;

a first removable clasp engaging said first eye hook;

a second magnet for securing to the second side of the bed of the pickup;

a second eye hook secured orthogonally to said second magnet;

a second removable clasp engaging said second eye hook;

a strap having a first end and a second end, wherein said strap slidably engages said first removable clasp and said second removable clasp and forms an open loop;

a securing means attached to said first end for removably engaging said second end of said strap for closing said open loop and being for selectively tightening said strap between the first side and the second side of the bed of the pickup for retaining an object within the bed;

wherein said securing means comprises a spring-loaded buckle;

an end magnet secured to said second end for securing said second end during travel of the pickup; and a resilient coating surrounding said first magnet, said end magnet and said second magnet, said resilient coating being adapted for preventing scratching of the bed of the pickup.

10. An adjustable magnetic cargo strap system comprising:

a first magnet for securing to a side of a bed of a pickup;

a first eye hook secured orthogonally to said first magnet;

a first removable clasp engaging said first eye hook;

a second magnet for securing to an opposite side of said bed of said pickup;

a second eye hook secured orthogonally to said second magnet;

a second removable clasp engaging said second eye hook;

a strap having a first end and a second end, wherein said strap slidably engages said first removable clasp and said second removable clasp and forms an open loop; and a securing means attached to said first end for removably engaging said second end of said strap for closing said open loop and for selectively tightening said strap between said sides of said bed of said pickup for retaining an object within said bed.

11. The adjustable magnetic cargo strap system of claim 10, wherein said securing means comprises a spring-loaded buckle.

12. The adjustable magnetic cargo strap system of claim 11, including an end magnet secured to said second end for securing said second end during travel of said pickup.

13. The adjustable magnetic cargo strap system of claim 12, including a resilient coating surrounding said first magnet, said end magnet and said second magnet for preventing scratching of said bed of said pickup.

* * * * *